Figure 1:
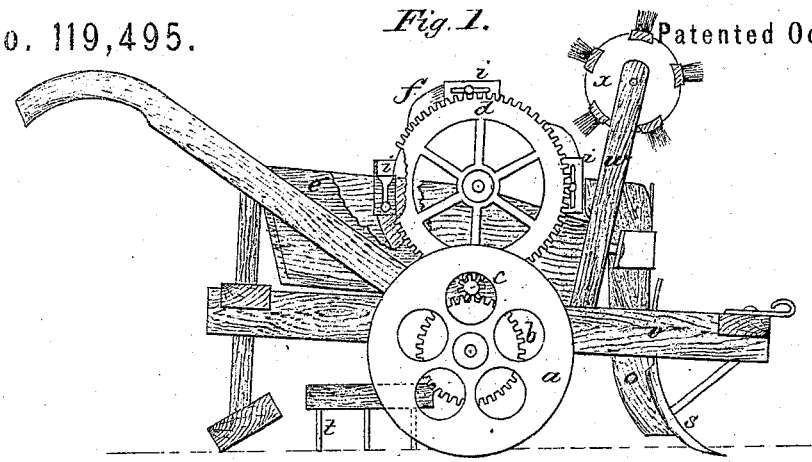
Figure 3:

A. P. Barry's,
Improved Seed-Planter & Distributer of Fertilizers.

No. 119,495.  Patented Oct. 3, 1871.

Witnesses:
Edwin James
T. C. Brecht

Inventor:
A. P. Barry.
per J. E. S. Holmead
Associate Attorney of
Jenkins & Olmstead.

UNITED STATES PATENT OFFICE.

ANDREW P. BARRY, OF MARTINSVILLE, MISSISSIPPI.

IMPROVEMENT IN GRAIN-DRILLS.

Specification forming part of Letters Patent No. 119,495, dated October 3, 1871.

*To all whom it may concern:*

Be it known that I, ANDREW P. BARRY, of the town of Martinsville and State of Mississippi, have invented a new, useful, and Improved Seed-Planter and Distributer of Fertilizers, of which the following is a correct and accurate description of my said invention, reference being had to the drawing annexed which constitutes a part of said description, and must be taken to illustrate more clearly the specification which herewith follows.

Figure 2:
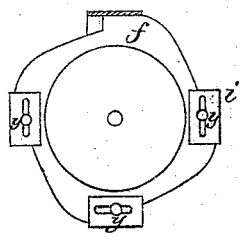
Figure 4:
Figure 5:
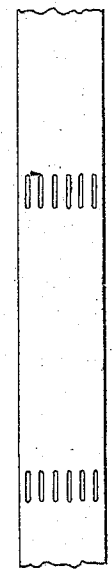

In the annexed drawing, Figure 1 is a side view of the seed-planter and distributer of fertilizers as when constructed and completely ready for operation, showing, also, some portions broken away or detached, the more clearly to illustrate this specification. Fig. 2 is a side view of the elevating-wheel or drum, upon which are placed the buckets for the distribution of the seeds or fertilizing substances, as hereinafter described.

The nature of my invention consists chiefly in providing the drum that conveys the seed from the hopper to the discharge-tube with adjustable buckets, whereby the feed of the machine can be regulated at pleasure. But my invention will be more readily understood by reference to the letters which indicate therein its several parts, wherein—

Fig. 1, $a$ represents one of two ground-wheels, which support, or at least partially support, the whole machine, and which, when in motion, give likewise movement to the cog-wheel $b$, which is firmly and securely attached thereto. The cog-wheel $b$ transmits movement to the spur-wheel $d$ by means of the intermediate pinion-wheel $c$, shown through the perforation of the ground-wheel $a$. The spur-wheel $d$ being placed upon a shaft which extends across and rests upon the receiving-box or hopper $e$, revolves this shaft, and with it also the distributing-drum or elevator $f$, which, in its revolutions within the said receiving-box or hopper, picks up, by means of the adjustable buckets $i$ placed thereon, the seed or fertilizer to be distributed. The seed or fertilizer thus taken up by the buckets above mentioned are distributed or discharged through the tube O just behind the ground-opener or plow-point S, and are partially or thoroughly covered by the earth which will naturally fall upon them as the seed-planter or distributer advances or moves forward. The harrow, shown by $t$, and the wooden or metal scraper $u$ will further serve the purpose of leveling the ground and of covering the seed or fertilizer, and thus complete, in a very thorough and efficient manner, the whole operation for which my device is intended. The frame-work, which rests upon the axle connecting the two ground-wheels, and upon which the receiving-box or hopper is placed, is represented by $v$. Two upright stanchions, $w$, (only one of which is shown in the drawing,) support a revolving drum or skeleton-wheel, $x$, which has suitable mitered grooves made therein for the reception, in the manner shown, of brushes, of hair or other suitable equivalent material, which brushes are to be used only in planting of cotton-seed. Motion is given to the brush-wheel $x$ by means of a cross-band or rope running in grooved wheels or pulleys attached to the sides of the distributing-drum or wheel and the brush-wheel aforesaid. One of the grooved wheels, namely, that which is attached to the distributing-wheel, is shown in Fig. 2. In the latter figure is also shown the manner by which the distributing-buckets are made adjustable and adapted to the dimensions required to deliver any given number of grains of seed or any required amount of fertilizing material or substances, the slots and screw-pins therein, shown at $y$, answering the purpose of adjustability and adaptation above mentioned. The plow-point or opener is placed directly or nearly directly under the single-tree, so that the seed may be dropped to the extreme end of the seed-planter, and consequently to the end of the row or furrow to be planted, an advantage and peculiar feature of my invention which I believe pertains to no other hitherto devised.

What I desire to secure by Letters Patent is the following:

The combination of the drum $f$, adjustable buckets $i$, connected as stated, tube O, and the planting mechanism, when the same are so arranged as to operate substantially as described.

A. P. BARRY.

Witnesses:
H. N. JENKINS,
L. I. OLMSTEAD.

(84)